United States Patent Office 2,895,050
Patented July 14, 1959

2,895,050
FLUORESCENT ARTIFICIAL TEETH

Pyungtoo William Lee, York, Pa., and Georg Müller, Sprendlingen, near Frankfurt am Main, Germany, assignors to Dentists' Supply Company of New York, York, Pa., a corporation of New York No Drawing. Application April 30, 1956
Serial No. 581,274

10 Claims. (Cl. 250—71)

This invention relates to artificial porcelain teeth capable of fluorescing in ultra-violet light and, more particularly, to producing such teeth, and similar dental articles, which fluoresce in the white range when exposed or subjected to ultra-violet light.

Natural teeth have white fluorescence when subjected to ultra-violet light. However, much research has been conducted upon artificial teeth over many years to attempt to reproduce in them as many of the characteristics of natural teeth as possible, but the important feature of fluorescence of any kind had not been attained prior to the discovery of Charles Dietz that the inclusion of small percentages of uranium in artificial porcelain teeth would provide such teeth with fluorescence, in accordance with U.S. Patent No. 2,301,174.

The manufacture of great quantities of porcelain artificial teeth embodying the Dietz invention has occurred since the invention was first commercially exploited by the assignee of said invention, said assignee incidentally being the assignee of the present invention. However, while said invention was a vast improvement over a complete lack of fluorescence in artificial porcelain teeth, the fluorescence produced by uranium when incorporated in such teeth is yellow-green in color and therefore it is possible to distinguish such artificial teeth from natural teeth when subjected to ultra-violet light.

In recent years, many attempts have been made to produce artificial porcelain teeth having a fluorescence which more closely approaches or matches the white fluorescence of natural teeth. However, the result of including conventional white fluorescent material in dental porcelain has been a very weak fluorescence under ultra-violet light, due probably to the active ingredients relied upon being depreciated or weakened during the high sintering or fusing temperatures to which artificial porcelain teeth must be subjected to vitrify them in producing finished teeth. By selecting desirable fluorescing ingredients for inclusion in the porcelain mixtures to be molded into raw tooth biscuits and vitrified to produce porcelain artificial teeth, it now has been found that white fluorescence can be provided in such teeth which compares most favorably with the white fluorescence of natural teeth, both as to color and intensity. This result has been achieved from the discovery that the combination of cerium with uranium results in the fluorescent color of cerium modifying the yellow-greenish fluorescent color of uranium to provide a white fluorescent color which matches very closely the white fluorescence of natural teeth when exposed to ultra-violet light.

Cerium oxide is the preferred form in which the cerium is added to the raw porcelain composition to modify the yellow-greenish fluorescence of the uranium ingredient of the composition. However, an additional modifying ingredient comprising preferably samarium oxide can be added to the tooth composition to further modify the uranium and cerium so as to additionally enhance the white fluorescence thereof. Samarium fluoresces a reddish color under ultra-violet light and this, when added to the other fluorescing ingredients set forth above, within the ranges specified hereinafter, modifies the fluorescing results so as to improve the similarity of the white fluorescence to natural teeth.

During the preliminary development work it was found that when the aforementioned fluorescent ingredients of the invention are added to the porcelain composition either in raw condition or inadequately fritted, acceptable white fluorescence is produced. However, the appearance of the tooth product in natural light is a dark gray which is completely incompatible with the requirements of the dental profession for delicately controlled shades of yellow and cream. It now has been found that this difficulty can be overcome by fritting the raw fluorescent-producing ingredients in a suitably fluxed medium and grinding the same to a suitable range of fine sizes before either molding into a tooth or mixing a portion thereof with non-fluorescent porcelain material and molding the mixture into a tooth. The molded tooth biscuit then is fired to produce a finished tooth in which the foregoing objectionable appearance under natural light is eliminated or at least is minimized beyond visible recognition.

The percentages of the fluorescent-producing ingredients in the total porcelain tooth mixtures are somewhat critical in that they are relatively small and in the preferred ranges of the compositions embodying the invention, said percentages preferably do not exceed 2% of the entire mixture, as is evident from the tables set forth hereinafter. The exact amount used will depend upon the opacity and the color of the porcelain in daylight, commensurate with affording the desired intensity of white fluorescence.

TABLE A

*Ranges of percentages of white fluorescent ingredients in tooth composition*

|  | Percent |
|---|---|
| Uranium oxide | .004–0.15 |
| Cerium oxide | .020–1.00 |
| Samarium oxide | None–.50 |

I desired, it is possible to obtain satisfactory white fluorescence by substituting vanadium oxide for a portion of the uranium oxide. It will be noted that, while samarium oxide is desirable for ultimate results, it may be omitted entirely within the broad spirit of the invention.

From the foregoing, it will be noted that the fritted composition containing fluorescent ingredients may be molded directly into teeth or a portion of a more concentrated frit may be mixed with non-fluorescent porcelain material and then molded into teeth, said teeth then being fused to form finished teeth.

Table B sets forth two specific examples respectively representing the foregoing embodiments of the invention, as follows:

TABLE B

|  | Feldspathic Porcelain 100% fritted—10 hrs. @ 2300° F. | Non-Feldspathic Porcelain Concentrate fritted 15 Mins. @ 2350° F., ground, and 6% added to base porcelain | |
|---|---|---|---|
|  |  | Fritted Concentrate | Raw Base |
|  | Percent | Percent | Percent |
| Feldspar | 76 | 1.20 | 26 |
| Quartz | 23 |  |  |
| "Vycor" |  | 3.84 | 66 |
| Kaolin | 0.8 | .38 | 1 |
| Boric Acid |  | .21 |  |
| Magnesium Oxide |  | .21 |  |
| Alumina |  |  | 1 |
| Manganese Dioxide |  | .045 |  |
| Fluorescent Materials: |  |  |  |
|    Uranium Oxide | .025 | .015 |  |
|    Cerium Oxide | .15 | .105 |  |
|    Samarium Oxide | .10 | None |  |
|  | 100 (approx.) | 6 (approx.) | 94 |

In the foregoing Table B, the "Vycor" constituent is a borosilicate glass having high resistance to thermal shock, sold under the trademark "Vycor."

As also will be seen from the foregoing, the invention is applicable to feldspathic as well as non-feldspathic porcelains. Hence it will be seen that the invention may be applied to dental porcelains of a wide range of compositions.

Further, the invention readily is applicable to pin-type teeth, such as conventional anterior teeth, or non-pin-type such as diatoric posterior teeth. Also, it is conventional practice in modern artificial porcelain tooth production to form composite teeth in which a body portion is partially or completely covered by an enamel-simulating layer and, in some forms of teeth, even intermediate layers are disposed between the body portion and enamel simulating layer. Normally the body portion is more opaque than the layer or layers covering the same, the latter being more translucent than the body portion and effectively transmit desired amounts of the color effects of the body portion. Accordingly, the amount of fluorescent producing ingredients of the porcelain composition for the enamel-simulating and intermediate layers may be slightly less than that in the body portion.

Referring again to Table B, any desired percentage of prefritted fluorescence-producing material relative to the raw porcelain base material may be selected, the selection of the desired percentages being governed by manufacturing convenience and economy. Further, it will be understood that the percentages of the fluorescence-producing agents in the concentrated frit may be varied from those given in Table B, whereupon the percentage of frit to be mixed with raw porcelain base material may be varied from those given in said table, as long as the overall percentage of fluorescence-producing ingredients per se are within the range of percentages set forth in Table A relative to the overall mixture from which the tooth products finally are molded.

In fritting the fluorescence-producing material of which two examples are given in Table B, the left-hand example is fritted to complete solution of the fluorescence-producing ingredients per se, comprising the last three compounds in the table. In the right-hand example in which only 6% of frit is used in mixture with the raw base materials, the fritting is not as complete as in the left-hand example as indicated by the gray appearance of the frit concentrate when viewed in daylight. It is believed complete solution of the fluorescence-producing ingredients occurs in the final fusing of the molded tooth biscuit or the like, since the aforementioned dark gray appearance in daylight is not present therein. Hence, in general, the incomplete fritting technique may be more advantageous from the standpoint of manufacturing economy and convenience than the longer fritted example set forth in Table B.

While the invention has been described in its several preferred embodiments, and has included certain details, it should be understood that the invention is not to be limited to the precise details herein illustrated and described since the same may be carried out in other ways falling within the scope of the invention as claimed.

We claim:

1. An artificial porcelain tooth product comprising essentially vitreous porcelain having incorporated therein mineral salts of uranium and cerium not exceeding substantially 2% by weight of the total weight of the tooth product composition, at least the cerium salt being fritted and said salts being in such proportion to each other as to modify each other suitably to produce white fluorescence in said tooth products comparable with that of natural teeth when viewed in ultra-violet light.

2. An artificial porcelain tooth product comprising essentially vitreous porcelain having incorporated therein the oxides of uranium and cerium, the total amount thereof not exceeding substantially 2% of the total weight of the tooth composition and functioning to modify each other suitably to produce white fluorescence comparable with that of natural teeth when viewed in ultra-violet light, at least the cerium oxide being fritted.

3. An artificial porcelain tooth product comprising essentially vitreous porcelain having incorporated therein mineral salts of uranium, cerium and samarium in minor proportions by weight to the total tooth composition and adequate to modify each other suitably to produce white fluorescence comparable with that of natural teeth when viewed in ultra-violet light, the total amount of said mineral salts not exceeding 2% of the total weight of the tooth product and at least the cerium salt being fritted.

4. An artificial porcelain tooth product comprising essentially vitreous porcelain having incorporated therein fritted oxides of uranium and cerium in minor proportions not exceeding substantially 2% by weight of the total weight of the tooth product and adequate to modify each other suitably to produce white fluorescence comparable with that of natural teeth when viewed in ultra-violet light.

5. An artificial porcelain tooth product comprising essentially vitreous porcelain having minor proportions of uranium and cerium oxides not exceeding substantially 2% of the total weight of the tooth product and substantially completely in solution with the porcelain components of the tooth product when the tooth product is vitrified and adequate to produce white fluorescence comparable with that of natural teeth when viewed in ultra-violet light, at least the cerium oxide being fritted prior to the vitrification of the tooth product.

6. An artificial porcelain tooth product comprising essentially vitreous poreclain components having incorporated substantially in complete solution therein when vitrified mineral salts of uranium and cerium not exceeding substantially 2% of the total weight of the tooth product and in proportion to modify each other suitably to produce white fluorescence comparable with that of natural teeth when viewed in ultra-violet light, the amount of cerium salt being substantially greater than that of the uranium salt and at least the cerium salt being fritted prior to vitrifying the tooth product.

7. An artificial vitrified porcelain tooth product comprising essentially vitreous procelain components having incorporated substantially in complete solution therein oxides of uranium and cerium in minor proportions not exceeding substantially 2% by weight to the total tooth composition and adequate to modify each other suitably to produce white fluorescence comparable with that of natural teeth when viewed in ultra-violet light, the amount of cerium oxide therein being substantially greater than that of uranium oxide and at least the cerium oxide being fritted prior to the tooth being vitrified.

8. An artificial porcelain tooth product fluxed from a mixture comprising essentially vitreous porcelain and a fritted concentrate consisting essentially of uranium and cerium oxides and flux, said oxides not exceeding substantially 2% of the total weight of the tooth product to produce white fluorescence comparable with that of natural teeth when viewed in ultra-violet light.

9. An artificial porcelain tooth product fluxed from a mixture comprising essentially vitreous porcelain and a fritted concentrate consisting of oxides of uranium, cerium and samarium and flux, said oxides not exceeding substantially 2% of the total weight of the tooth to produce white fluorescence comparable with that of natural teeth when viewed in ultra-violet light and at least the oxide of cerium being fritted prior to being incorporated in said tooth product.

10. An artificial porcelain tooth product fluxed from a mixture comprising essentially vitreous poreclain and a fritted concentrate consisting essentially of uranium and cerium oxides and flux, said oxides not exceeding substantially 2% of the total weight of the tooth and being substantially in complete solution with the porcelain components thereof when the tooth product is vitrified to produce therein white fluorescence comparable with that of natural teeth when viewed in ultra-violet light and at least the oxide of cerium being fritted prior to being incorporated in said tooth product.

References Cited in the file of this patent

UNITED STATES PATENTS 2,301,174   Dietz ------------------ Nov. 10, 1942

OTHER REFERENCES

Some Aspects of the Luminescence of Solids, by F. A. Kroger, Elsevier Publishing Co., Inc., New York, N.Y., 1948, pages 283, 284, 288, 289, 294, 295, and 296.